(12) United States Patent
Bettati

(10) Patent No.: US 10,059,525 B2
(45) Date of Patent: Aug. 28, 2018

(54) CONVEYOR

(71) Applicant: BETT SISTEMI S.R.L., Carpi (Modena) (IT)

(72) Inventor: Tienno Bettati, Correggio (IT)

(73) Assignee: BETT SISTEMI S.R.L., Carpi (Modena) (IT)

( * ) Notice: Subject to any disclaimer, the term of this patent is extended or adjusted under 35 U.S.C. 154(b) by 89 days.

(21) Appl. No.: 14/676,873

(22) Filed: Apr. 2, 2015

(65) Prior Publication Data
US 2015/0203301 A1    Jul. 23, 2015

Related U.S. Application Data

(62) Division of application No. 13/513,693, filed as application No. PCT/IB2010/055572 on Dec. 3, 2010, now Pat. No. 9,016,467.

(30) Foreign Application Priority Data

Dec. 4, 2009  (IT) .............................. BO2009A0784

(51) Int. Cl.
*B65G 21/16*   (2006.01)
*B65G 17/08*   (2006.01)
*B65G 21/22*   (2006.01)

(52) U.S. Cl.
CPC ........... *B65G 21/16* (2013.01); *B65G 17/086* (2013.01); *B65G 21/22* (2013.01)

(58) Field of Classification Search
CPC .............................. B65G 21/16; B65G 17/086
USPC .................................. 198/850–853; 474/206
See application file for complete search history.

(56) References Cited

U.S. PATENT DOCUMENTS

| 3,868,011 | A |   | 2/1975  | Janzen et al. |
| 4,742,907 | A |   | 5/1988  | Palmaer |
| 4,961,492 | A | * | 10/1990 | Wiseman ............. B65G 17/086 198/841 |

(Continued)

FOREIGN PATENT DOCUMENTS

| EP | 0 521 506 A2 | 1/1993 |
| EP | 1 318 085 A1 | 6/2003 |

(Continued)

*Primary Examiner* — Leslie A Nicholson, III
(74) *Attorney, Agent, or Firm* — Young & Thompson

(57) ABSTRACT

A conveyor of the articulated chain type for transporting products, includes a mounting frame for elements for supporting and guiding a conveyor belt. The conveyor belt includes a plurality of links forming elements for supporting the product and articulated connected to each other, each link having a first and a second plurality of longitudinal protrusions which extend in opposite longitudinal directions and which are transversally spaced from each other so as to form respective spaces for receiving the longitudinal protrusions of an adjacent link. The link includes a perpendicular protuberance forming elements for engaging and sliding against a transversal centering surface of guide elements in a curved stretch of the belt and a transversal protuberance extending laterally of the link and forming elements for engagement and sliding relative to a perpendicular longitudinal retaining surface of the guide elements, retaining elements for keeping a connecting pin inserted between adjacent links.

19 Claims, 11 Drawing Sheets

(56) References Cited

U.S. PATENT DOCUMENTS

| | | | |
|---|---|---|---|
| 5,031,757 A * | 7/1991 | Draebel | B65G 17/086 198/841 |
| 5,127,515 A | 7/1992 | Damkjaer | |
| 5,372,248 A | 12/1994 | Horton | |
| 5,489,020 A * | 2/1996 | Clopton | B65G 17/086 198/851 |
| 5,547,071 A | 8/1996 | Palmaer et al. | |
| 5,573,105 A | 11/1996 | Palmaer | |
| 5,645,160 A | 7/1997 | Palmaer et al. | |
| 6,059,097 A * | 5/2000 | Clopton | B65G 17/065 198/852 |
| 6,079,553 A | 6/2000 | Takahashi et al. | |
| 6,382,405 B1 | 5/2002 | Palmaer | |
| 6,499,587 B1 | 12/2002 | Greve | |
| 6,827,204 B2 | 12/2004 | Cribiu | |
| 7,234,589 B2 | 6/2007 | Sedlacek | |
| 7,494,006 B2 * | 2/2009 | Knott | B65G 17/08 198/850 |
| 7,854,315 B2 * | 12/2010 | Stebnicki | B65G 17/40 198/779 |
| 7,967,132 B2 | 6/2011 | Menke et al. | |
| 2006/0151304 A1 | 7/2006 | Ozaki et al. | |
| 2008/0190742 A1 | 8/2008 | Zmaj | |
| 2008/0242462 A1 | 10/2008 | Mitzschke et al. | |
| 2011/0155542 A1 | 6/2011 | Menke et al. | |

FOREIGN PATENT DOCUMENTS

| | | |
|---|---|---|
| EP | 1 739 034 A1 | 1/2007 |
| WO | 03/024846 A1 | 3/2003 |
| WO | 2005/110897 A1 | 11/2005 |
| WO | 2006/120354 A1 | 11/2006 |
| WO | 2009/106953 A1 | 9/2009 |
| WO | 2009/106976 A1 | 9/2009 |

* cited by examiner

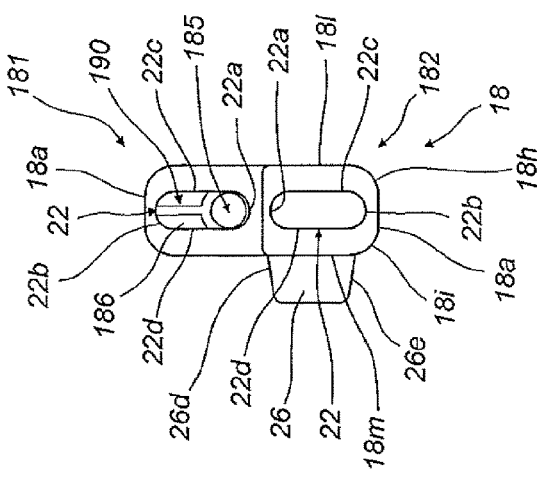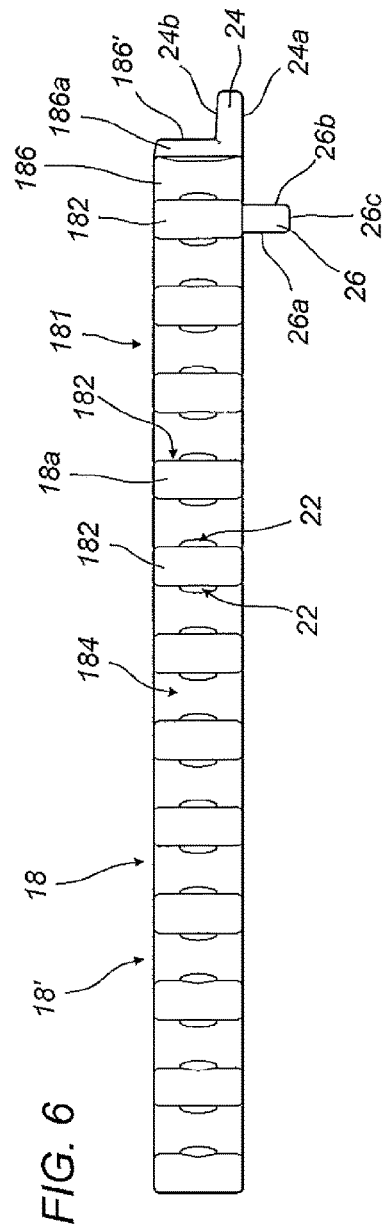

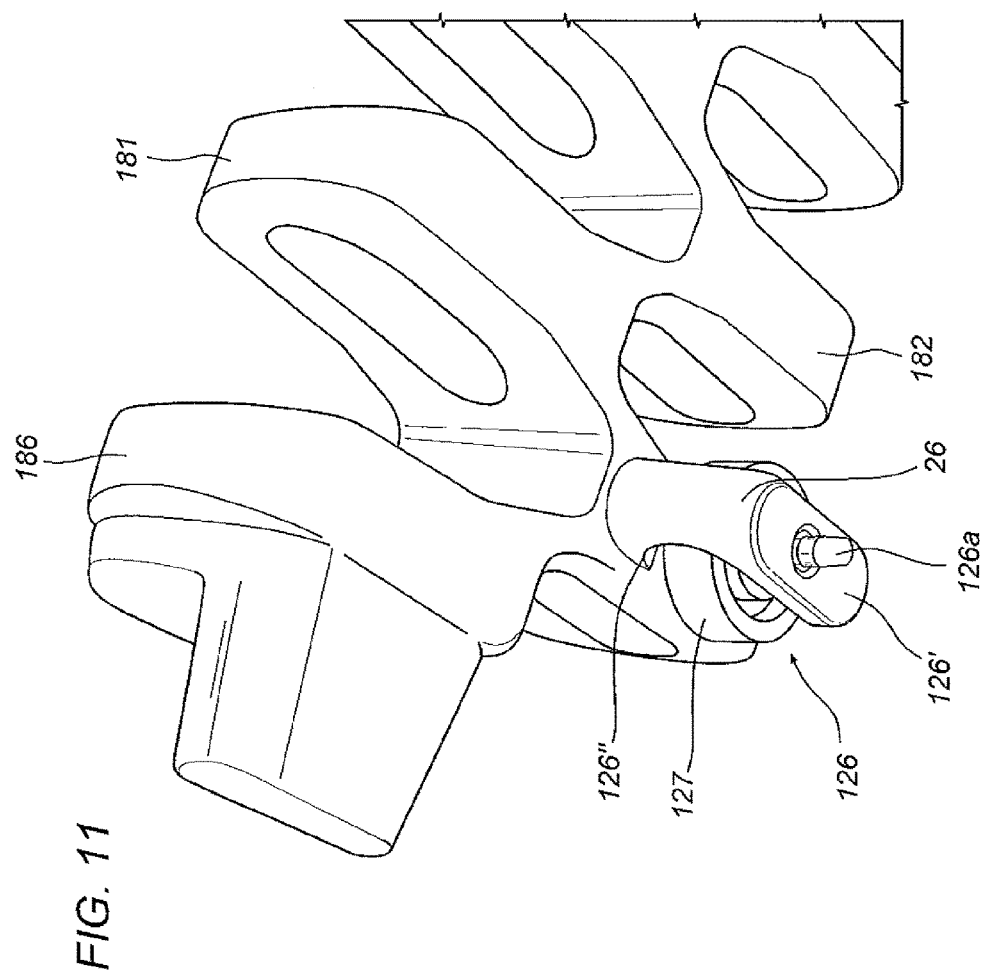

CONVEYOR

TECHNICAL FIELD

This invention relates to a conveyor, in particular of the articulated chain type, for transporting products.

BACKGROUND ART

Conveyors of the articulated chain type for transporting products are known which comprise a mounting frame for supporting means which support and guide a conveyor belt which in turn comprises a plurality of plastic links constituting means for supporting the product and connected to each other in articulated fashion, each link having respective pluralities of longitudinal protrusions which extend in opposite longitudinal directions and which are transversally spaced from each other in such a way as to form respective spaces for receiving the longitudinal protrusions of an adjacent link.

More specifically, conveyors of the articulated chain type are known which are used for transporting products or objects along a respective path having straight stretches and curved stretches and which comprise a plurality of plastic links that are articulated to each other through respective pins inserted in transversal holes made in the longitudinal protrusions of the belt links.

For holding each connecting and articulation pin within the respectiver oblong hole in the belt link once the pin has been inserted to join respective links with each other, several solutions have been proposed.

One prior art solution contemplates the provision of a block separate from the plastic link to be associated, upon assembly, with a longitudinal protrusion lateral of the link in such a way as to close a hole at the end of the link through which the pin passes. A system of this kind for locking the articulation pin in the inserted condition is disadvantageous because it involves making separate parts and applying them to the link, which means complex and time-consuming assembly operations. Furthermore, once the separate blocks have been applied to the link, subsequent use leads to wear which may cause them to break and come apart from the link, allowing the articulation pin to slip out, with all the obvious problems that this evidently produces.

In another solution, a hole is made in one side of the link to allow the articulation pin to be inserted. The hole is, however, totally offset relative to the zone where the pin is inserted into the oblong holes in the longitudinal protrusions of the link. Inserting the pin thus means forcing the pin along a curved path so it goes into the lateral hole and from there into the oblong holes in the longitudinal protrusions which are in an offset position relative to the lateral hole. This task is complex and awkward and it is easy to break the link and/or the pin while it is being done.

Another common problem with conveyors of the articulated chain type is that the links, made of plastic, tend to break, especially at the lateral edges of the link which slide against the inside of the guide of the curved stretches of the belt. In effect, in the curved stretches, this sliding movement causes the link to scrape the inside guide surface, causing wear and subjecting the link to considerable stresses which lead not only to breakages but also to excessive vibrations and noise.

As means of centering and perpendicular retention, other prior art conveyor solutions contemplate the provision of perpendicular tabs terminating with transversal tabs suitable for gripping corresponding longitudinal guide profiles on the side opposite to the body of the link. In practice, these prior art conveyors use these L-shaped tabs as means of perpendicular retention and transversal centering for gripping respective first and second guide profiles at the bottom of the belt. With these conveyors, however, the result is excessive friction due to the multiplicity of the points of contact between the L-shaped tabs on the underside of the link and the corresponding guide profiles, which, in this case too, leads to excessive vibrations and noise.

Also known are conveyors which have transversally extending portions designed to be inserted into lateral dovetail guides in the form of transversal portions applied to the link bodies. The risk in this case is that stresses generated during conveyor operation tends to cause these applied portions to come out of the guides.

A yet further drawback of the prior art conveyors is due to the awkward and time-consuming process required to assemble current configurations of the guide means.

DISCLOSURE OF THE INVENTION

This invention proposes a new solution alternative to the solutions known to the state of the art and, more specifically, a solution which can overcome one or more of the above mentioned drawbacks or problems and/or satisfy one or more of the needs which may be inferred from the above description of the prior art.

It has been provided a conveyor, in particular of the articulated chain type, for transporting products, comprising a mounting frame for means for supporting and guiding a conveyor belt; said conveyor belt comprising a plurality of links forming means for supporting the product and connected to each other in articulated fashion, each link having opposite pluralities of longitudinal protrusions where the respective longitudinal protrusions are transversally spaced from each other in such a way as to form respective spaces for receiving the longitudinal protrusions of an adjacent link; the conveyor being characterized in that the link comprises a perpendicular protuberance which forms means for engaging and sliding against a transversal centering surface of guide means in a curved stretch of the belt.

This makes it possible to avoid damage to the lateral flank of the belt due to excessive friction against the guide on the inside of the curved stretches, and also to reduce vibrations and noise.

According to another aspect of it, it is provided a conveyor, in particular of the articulated chain type, for transporting products, comprising a mounting frame for means for supporting and guiding a conveyor belt; said conveyor belt comprising a plurality of links forming means for supporting the product and connected to each other in articulated fashion, each link having opposite pluralities of longitudinal protrusions where the respective longitudinal protrusions are transversally spaced from each other in such a way as to form respective spaces for receiving the longitudinal protrusions of an adjacent link; the conveyor being characterized in that the link comprises a transversal protuberance, made as one with the link body, extending laterally of the link and forming means for engagement and sliding relative to a perpendicular longitudinal retaining surface of guide means.

This makes it possible to avoid use of separate elements which have to be applied to the link, requiring extended assembly times and tending to come loose from the link when subjected to stress.

According to another aspect of it, it is also provided a conveyor, in particular of the articulated chain type, for transporting products, comprising a mounting frame for means for supporting and guiding a conveyor belt; said conveyor belt comprising a plurality of links forming means for supporting the product and connected to each other in articulated fashion, each link having opposite pluralities of longitudinal protrusions where the respective longitudinal protrusions are transversally spaced from each other in such a way as to form respective spaces for receiving the longitudinal protrusions of an adjacent link; the conveyor being characterized in that it comprises means for keeping a connecting pin in the inserted condition between adjacent links, said retaining means comprising a respective transversal through hole through which the articulation pin passes and where means are provided for engaging and locking the pin after it has been inserted.

This makes it possible to avoid use of separate elements applied to the link to form means for retaining the connecting pin, that is to say, to avoid having to perform excessively complex operations to assemble the belt.

According to yet another aspect of it, the invention also provides a conveyor, in particular of the articulated chain type, for transporting products, comprising a mounting frame for means for supporting and guiding a conveyor belt; said conveyor belt comprising a plurality of links forming means for supporting the product and connected to each other in articulated fashion, each link having opposite pluralities of longitudinal protrusions where the respective longitudinal protrusions are transversally spaced from each other in such a way as to form respective spaces for receiving the longitudinal protrusions of an adjacent link; the conveyor being characterized in that it comprises guide means which comprise a guide portion and a fastening portion, where the fastening portion is in the form of an enlarged portion that is integral with the guide portion through a narrow portion designed to pass through a longitudinal slot of a supporting profile.

That way, a guide that is quick and easy to assemble can be made.

The invention also addresses a corresponding conveyor link and a respective conveyor belt or chain.

BRIEF DESCRIPTION OF THE DRAWINGS

These and other innovative aspects are set out in the appended claims and its technical features and advantages are apparent from the detailed description which follows of non-limiting example embodiments of it with reference to the accompanying drawings, in which:

FIG. 6 is a front view of the link of FIG. 5;

FIG. 7 is a side view of the link of FIGS. 5 and 6;

FIG. 11 is a perspective view from below of a second preferred embodiment of the link used in the conveyor according to this invention.

DESCRIPTION OF THE PREFERRED EMBODIMENTS OF THE INVENTION

Figure 1:
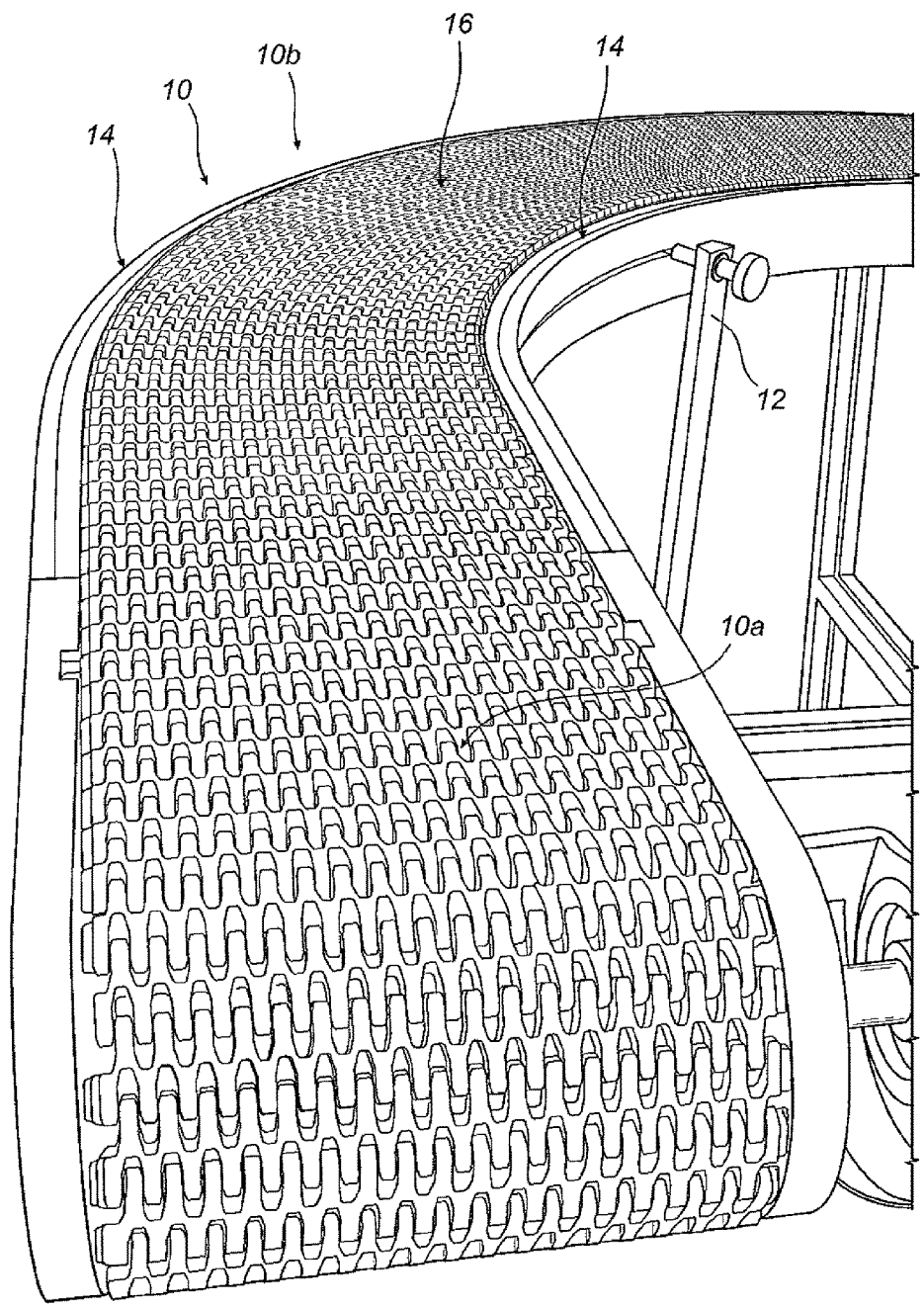
FIG. 1 is a perspective view of a part of a preferred embodiment of the conveyor according to this invention.

The accompanying drawings illustrate a first preferred embodiment 10 of a conveyor, in particular of the articulated chain type, for transporting products, or objects, along a respective path having straight stretches 10a and curved stretches 10b, lying in the conveyor's feed plane.

As illustrated, the conveyor 10 comprises a mounting frame 12 for means for slidably supporting and guiding an endless belt or chain 16 which is movable longitudinally in such a way as to define an upper positive stretch 16a and a lower return stretch 16b, the ends of these stretches being provided with revolving elements, or wheels, for driving, pushing or pulling the belt, in particular having respective teeth acting in conjunction with the belt to be fed. More specifically, the belt feed drive wheel or element is controlled by a respective electric motor which, like the pushing and pulling drive wheels, is not illustrated in detail in the accompanying drawings.

Belt guide means 14, 14 are provided which define means for perpendicularly retaining the belt and which, more specifically, are designed to prevent the positive stretch 16a of the belt from being lifted.

The belt guide means 14 also define means for transversally centering the belt in the feed plane, as will become clearer as this description continues, in the longitudinal stretches 10a of the belt.

As illustrated, the conveyor belt 12 is composed of a plurality of links 18 of suitable plastic material, made by die forming, which in their entirety define a table, or means, for supporting the product, the links 18 being connected to each other in articulated fashion, in particular, in a freely rotatable manner according to a vertical plane to pass from the positive feed stretch to the negative return stretch.

More specifically, to form a belt of desired transverse width, the use of a plurality of links 18 is imaginable which are transversely aligned with each other and which are held, together with the corresponding longitudinally adjacent links—that is to say, those preceding and following the respective transverse row of links—through corresponding connection and articulation pins 20, as will become clearer as this description continues.

As may be clearly inferred from FIGS. 4A to 7, a preferred embodiment of the link 18 comprises a plurality of opposite longitudinal protrusions 181, 182 extending longitudinally on both longitudinal sides, or edges, of the link.

In more detail, the link or shaped block, 18 comprises a plurality of front longitudinal protrusions 181 and a plurality of rear longitudinal protrusions 182, which are longitudinally offset with respect to the front longitudinal protrusions 181.

In practice, the link 18 comprises respective pluralities of longitudinal protrusions 181, 182 which extend on both longitudinal sides or edges of the link and where the longitudinal protrusions of one plurality are offset in a longitudinal direction relative to the longitudinal protrusions of the other plurality.

As illustrated, the front and rear longitudinal protrusions 181, 182 are transversally spaced from each other in such a way as to form, between transversally adjacent protrusions, respective spaces 183, 184 for receiving the longitudinal protrusions of a longitudinally adjacent link.

As may be inferred in particular from FIG. 4B, a respective pin, or elongate rod, 20 is adapted to connect adjacent links 18 to each other.

More specifically, the pin 20 is designed to be inserted into corresponding transversal through holes 22 provided in the longitudinal protrusions 181, 182, the holes 22 being oblong in shape in the longitudinal direction so as to allow the links themselves to move longitudinally relative to each other when moving in the curved stretches 10b in the belt feed plane.

In practice, in the straight stretches 10a, the longitudinally adjacent links 18, 18 are spaced apart from each other, as shown in FIG. 4B, whilst in the curved stretches 10b, the inside edge, or edge corresponding to the short side of the belt curve, the corresponding lateral portions of the links are close together, as may also be seen clearly in FIG. 4A.

Obviously, in the curved stretches 10b, the link portions on the outside of the short side of the curve are spaced apart from each other in the direction of feed.

Longitudinally adjacent links are placed in a condition where they are close together when the belt, or chain, is assembled, that is to say, when the connecting pin, or rod, 20 is inserted, as will become clearer as this description continues.

As may be inferred in particular from FIG. 7, the transversal through hole 22 of the longitudinal protrusion is defined by a longitudinally oblong edge, or lip, having curved, opposite end faces, and more specifically, a transversal inside face, denoted by the reference 22a, in the central part of the link, and a transversal outside face, denoted by the numeric reference 22b, facing the outside or longitudinal end of the link. The curved transversal faces 22a, 22b of the edge defining the oblong hole 22 are joined, or connected, to an upper and a lower longitudinal face, denoted by the numeric references 22c and 22d.

As illustrated, in the positive feed stretch 18', each link 18 has an outside, or upper, perpendicular surface which is adapted to define a support for the product or object to be conveyed, or on which means for engaging or resting the product to be conveyed are provided.

Advantageously, the conveyor disclosed herein has a link 18 with non-return means preventing the pin 20 from coming out once it has been inserted, that is to say, retaining means for keeping the connecting pin 20 in the inserted condition between the links.

The retaining means for keeping the connecting pin 20 in the inserted condition comprise a respective transversal through hole 185 through which the articulation pin 20 passes and where means 187' are provided for engaging and locking the pin 20 after it has been inserted.

The means 187' are, more specifically, means for engaging and locking the connecting pin 20 to stop it from moving backwards and slipping out.

In practice, the hole 185 is defined by a corresponding perametric, and more specifically, substantially circular, edge 187 whose diameter substantially corresponds, and more specifically, is slightly greater than the diameter of the articulation pin 20.

The retaining means 187' extend radially from the edge 187.

Figures 10A, 10B, 10C:
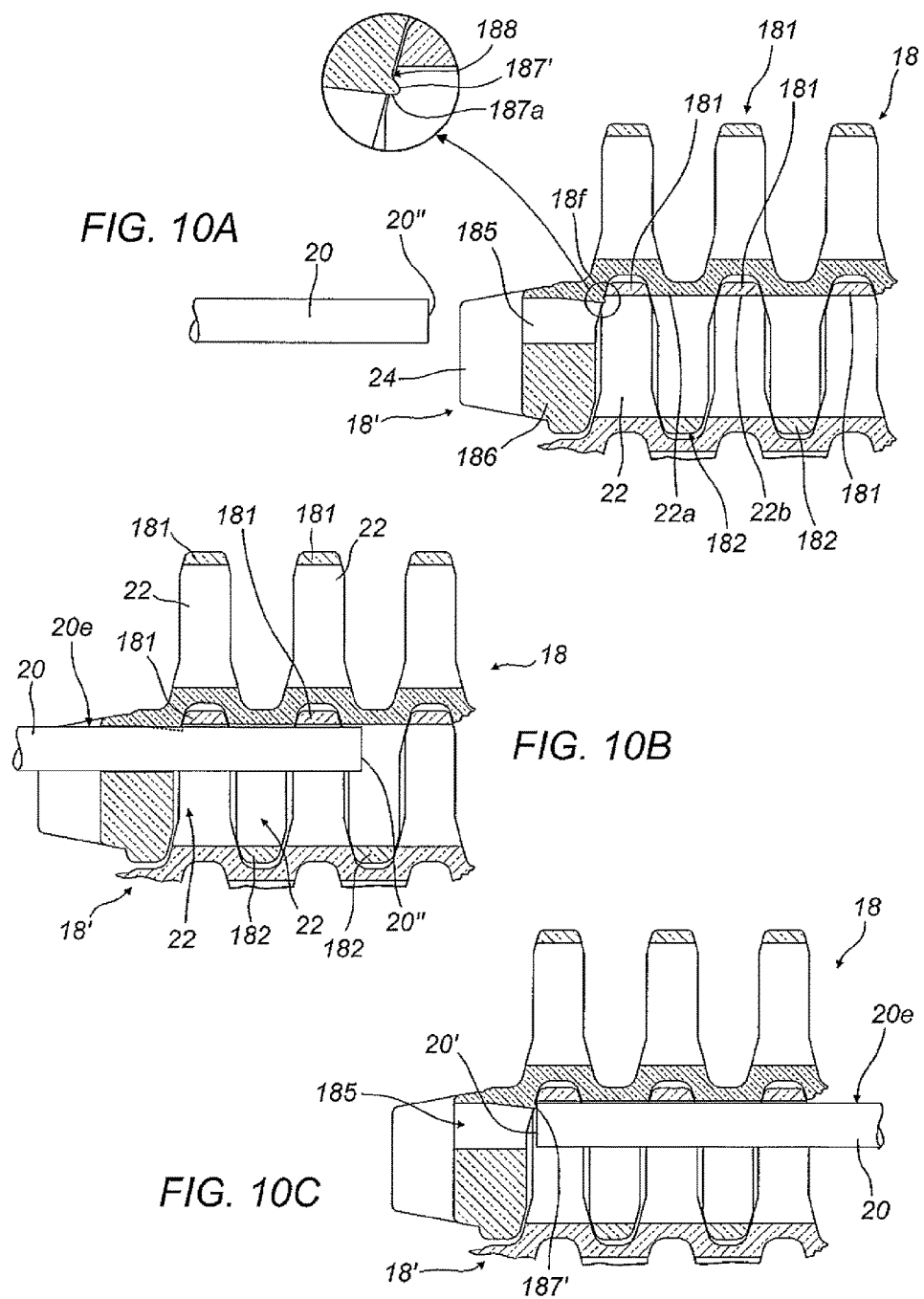
FIGS. 10A to 10C illustrate the different steps of inserting a connecting pin between the links.

As shown in FIGS. 10A to 10C, the articulation pin 20 is in the form of an elongate rod, preferably made of plastic material, having a cylindrical outer surface 20e and opposite transversal ends faces 20', 20", which are perpendicular to the cylindrical, or lateral surface, of the pin, that is to say, which form with the latter a sharp edge, or an angle substantially equal to 90°.

As illustrated by the sequence of drawings from FIG. 10A to FIG. 10C, when the connecting pin 20 is in the inserted condition, it has a rear face 20', which makes a sharp edge, for securely engaging the longitudinal retaining surface 187'.

Advantageously, the retaining means 185, 187' for keeping the pin 20 in the inserted condition are provided at a longitudinal end protrusion 186 of the link 18 which forms part of the product supporting surface and which thus affords a uniform surface for supporting the product between the lateral guides 14, 14.

In more detail, advantageously, the retaining means for keeping the pin 20 in the inserted condition comprise a vertical, longitudinal surface 187' which engages the end 20' of the pin 20, when inserted, and which extends towards the inside of the hole 185 through which the pin 20 itself passes.

In practice, the retaining means for keeping the pin 20 in the inserted condition comprise a surface 187' which engages the end 20' of the pin 20, when inserted, and which can be positioned in a pin engaging and retaining condition when the pin 20 is in the inserted condition where it connects the links.

In practice, the retaining means for keeping the pin 20 in the inserted condition comprise a surface 187' which engages the pin 20, when inserted, and which can be moved between an insertion position for passing the pin through the respective hole 185, towards the oblong holes 22 of the reciprocally facing longitudinal protrusions of adjacent links, and an engaging and retaining position when the pin 20 is in the inserted condition where it connects the links.

More specifically, the retaining means for keeping the pin 20 in the inserted condition comprise a surface 187' which engages the end 20' of the pin 20, when inserted, and which can be moved elastically between a position for inserting the pin 20 into the hole 22 and a position for engaging and retaining the pin 20 in the inserted condition.

The retaining means for keeping the pin 20 in the inserted condition are defined by a longitudinal border 187' of a face, or portion, 187a of the peripheral edge 187 of the insertion hole 185, said face, or portion, 187a of the peripheral edge 187 defining means of interference with the outside surface 20e of the pin 20.

The face, or portion, 187a of the peripheral edge 187 defining means of interference with the outside surface of the pin 20 extends radially towards the inside of the hole 185 and is elastically compliant when the pin 20 is pushed into, or forced through, the hole 185. The face, or portion, 187a returns elastically to the rest position, radially extended in the hole 185 after the pin 20 has passed through.

The elastically compliant face, or portion, 187a of the peripheral edge 187 defining means of interference with the outside surface of the pin 20 pushes the pin against the opposite face, or portion, of the edge 187 of the hole 185, causing the forced insertion, with friction, of the pin 20, which moves transversally to the hole 185 towards the oblong holes 22 of the protrusions 181, 182 of the links to be connected.

The vertical, longitudinal surface 187' which engages the end of the pin 20 is located at the longitudinal face on the inside of the longitudinal lateral link extension 186.

In practice, the retaining means for keeping the pin 20 in the inserted connecting condition may be considered as being defined by a substantially flat radial surface 187a which is elastically compliant towards the outside of the hole when the articulation pin 20 is forced through and which returns radially to the original, extended condition towards the inside of the hole 185 after the pin has passed all the way through the retaining hole 185.

In practice the interference surface 187a of the hole 185 moves between a radially flattened position during the passage of the pin 20 and a radially extended position after the pin 20 has passed through.

As may be clearly inferred from FIGS. 10A to 10C, the transversal inside face, or surface, 187a of the hole 185, defining the retaining means for keeping the pin 20 in the inserted condition where the longitudinally adjacent links 18 and 18' to be connected are close to each other, is transversally aligned with the outside end face 22b of the edge defining the oblong hole of the link 18' which is associated with the same link 18 in which the retaining hole 185 is made.

Further, the hole 185 of the respective link 18, defining the retaining means for keeping the pin 20 in the inserted condition, is substantially transversally aligned, and more specifically, as may be clearly inferred from FIG. 7, slightly offset towards the corresponding longitudinal end or towards the outside of the link 18, with respect to the transversal inside face 22a of the edge defining the corresponding oblong hole 22 made in the respective longitudinal protrusion 181 of the link 18.

In practice, the transversal inside face, or surface, 187a of the hole 185 in the respective link 18, defining the retaining means for keeping the pin 20 in the inserted condition, is substantially transversally aligned, and more specifically, slightly offset towards the outside or towards the corresponding longitudinal end with respect to the transversal inside face 22a of the edge defining the corresponding oblong hole 22 of the link 18.

Further, the elastically compliant portion 187a of the edge 187 forming the through hole 185 for the pin 20 has a substantially flat shape.

In practice, means are advantageously provided for defining the property of elastic compliance for the engagement and retaining surface 187', or for the surface 187a of the retaining hole 185 defining the means of interference with the pin 20 in the inserted condition.

The means for defining the property of elastic compliance between the engagement and retaining surface 187', and the surface 187a, defining the means of interference with the pin 20, comprise a perimetric cavity extending transversally inside the body of the respective protrusion, that is, inside the respective lateral longitudinal protrusion 186, the perimetric cavity being denoted by the reference numeral 188 and being radially provided on the outside of the edge 187a, and more specifically, on the outside of the part of the edge 187a of the hole 185 which is positioned, relative to it, on the inside, or on the side facing the central part of the link 18.

The perimetric cavity 188, which is recessed in the inside lateral longitudinal face 18f of the longitudinal protrusion 186, is shallow and is provided in the vicinity of the flat edge 187a defining the compliant surface of interference with the insertion pin 20.

In practice, the absence of material in the cavity 188 under, or on the outside of, the protruding portion 187a facilitates its radial compliance suitable for allowing the pin 20 to pass through.

In this embodiment of the retaining means for keeping the pin 20 in the inserted connecting condition, non-return means are, in practice, provided which are made as one with the body of the link 18.

Means are also advantageously provided for transversally centering the belt 16 relative to the link 18, which are defined by a corresponding lateral longitudinal surface 186' of the link 18 and which operate in the straight stretch of the conveyor.

The means for transversally centering the belt 16 relative to the link 18 are integral, or made as one, with the body of the link 18.

Figure 2A:
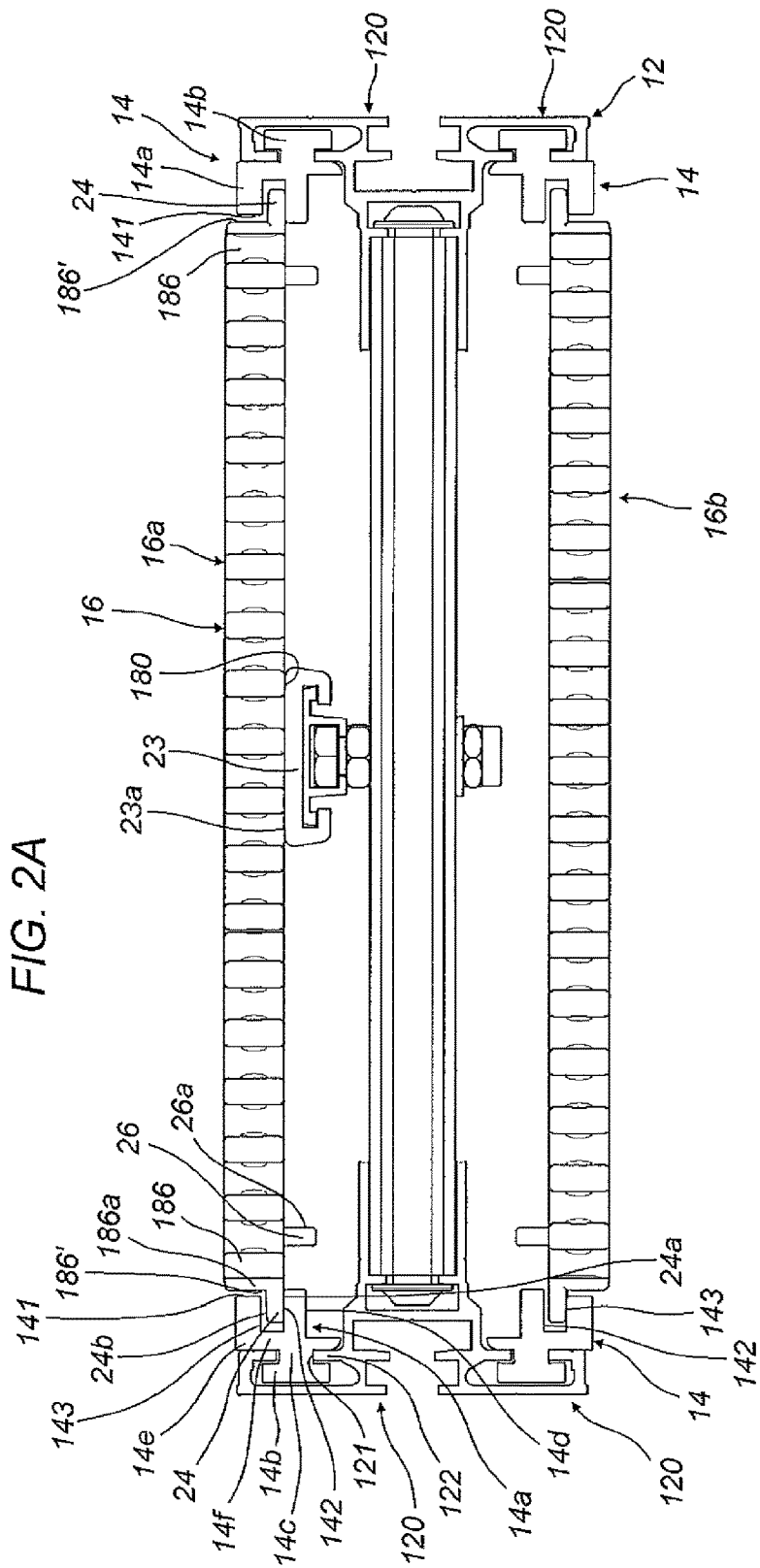
FIG. 2A is a transversal cross section of a part of a straight stretch of the preferred embodiment of the conveyor according to this invention.

In practice, means are provided for centering the belt relative to the link 18 and which are defined by a corresponding lateral longitudinal surface 186' that is integral, or made as one, with the link 18 and that defines means for engaging and sliding against an opposite longitudinal vertical surface 141 of the guide means 14, in particular in the straight stretches 10a of the path of the belt 16, as may be inferred from FIG. 2A.

The lateral longitudinal engagement and sliding surface 186' of the link 18 is located at a lateral end protrusion 186 of the link 18 and faces towards the outside of the belt 16, that is to say, towards the lateral flank of the conveyor.

The transversal retaining through hole 185 of the lateral longitudinal end protrusion 186 of the link 18 is positioned close to a longitudinal end on the inside, that is facing the central part of the link, of the lateral longitudinal protrusion 186 itself.

The retaining through hole 185 for retention in the perpendicular, or vertical, direction is substantially positioned on the center line of the lateral longitudinal protrusion 186 itself.

For advantageous wear resistance, the lateral longitudinal protrusion 186 has a lateral thickening block 186a, defining the lateral longitudinal engagement and sliding surface 186'.

The block 186a is obviously integral or made as one with the lateral longitudinal protrusion 186 and with the body of the link 18.

As illustrated, the block 186a has diverging lateral edges connecting with the lateral longitudinal protrusion 186.

In this link, the transversal thickness of the longitudinal protrusions 181, 182 and 186 is less than, and more specifically, less than half the height, or perpendicular dimension, of the longitudinal protrusion itself.

Further, the longitudinal length of each longitudinal protrusion 181, 182, 186 is greater than the height, or perpendicular dimension, of the longitudinal protrusion itself.

Figure 2B:
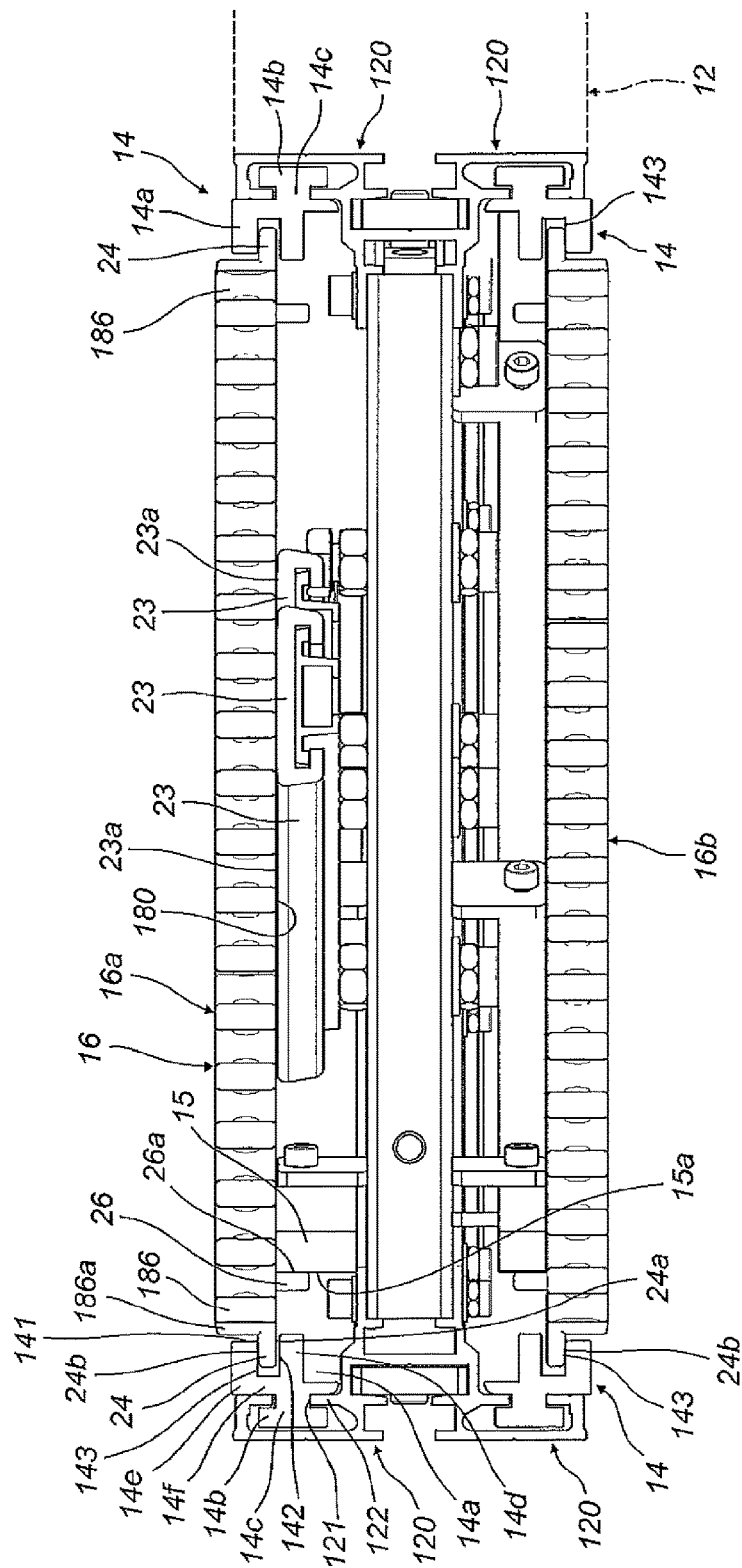
FIG. 2B is a transverse cross section of a part of a curved stretch of the preferred embodiment of the conveyor according to this invention.
Figure 3:
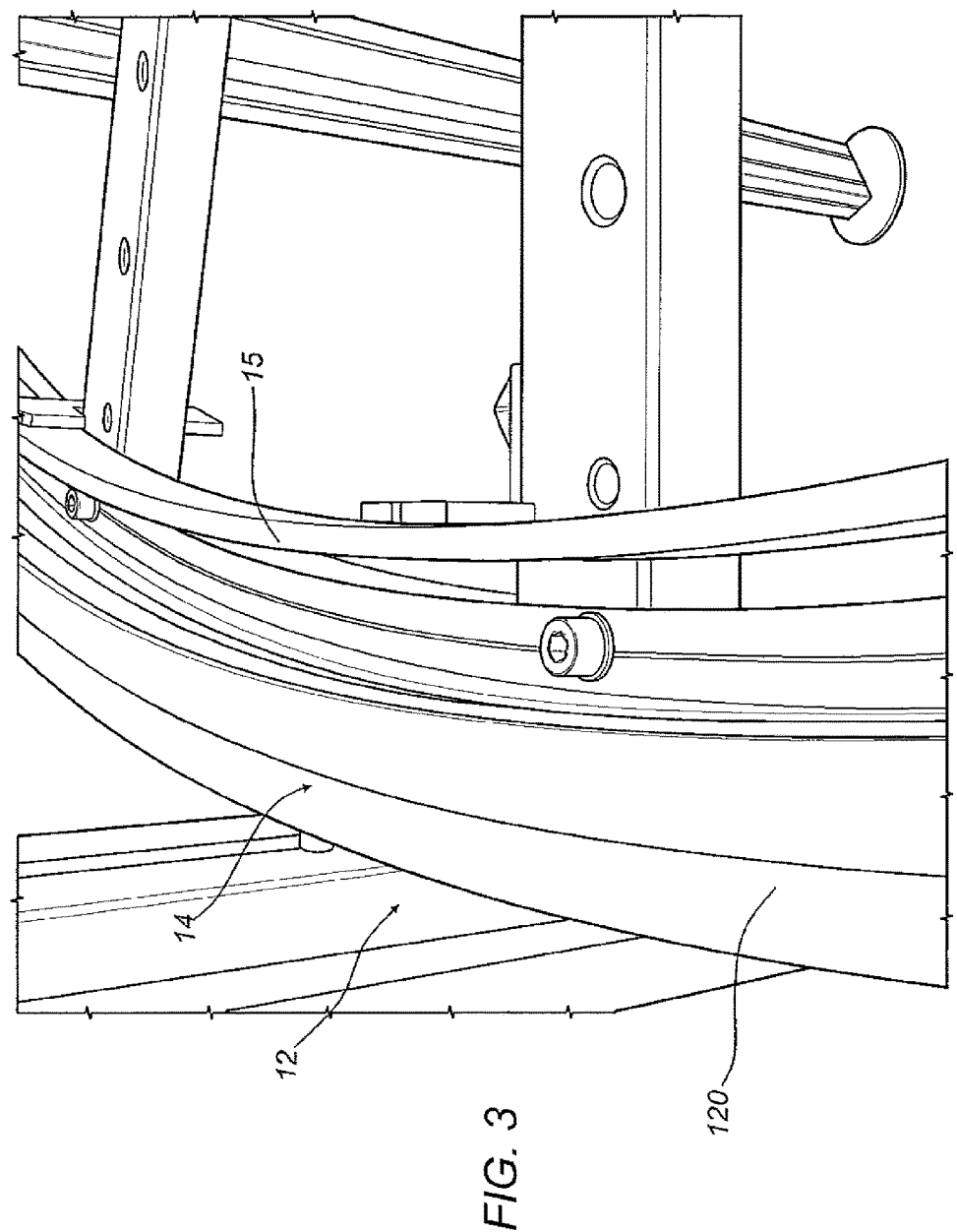
FIG. 3 is a perspective view of a detail of only the mounting and guide structure in a curved stretch of the preferred embodiment of the conveyor according to this invention.
Figure 4:
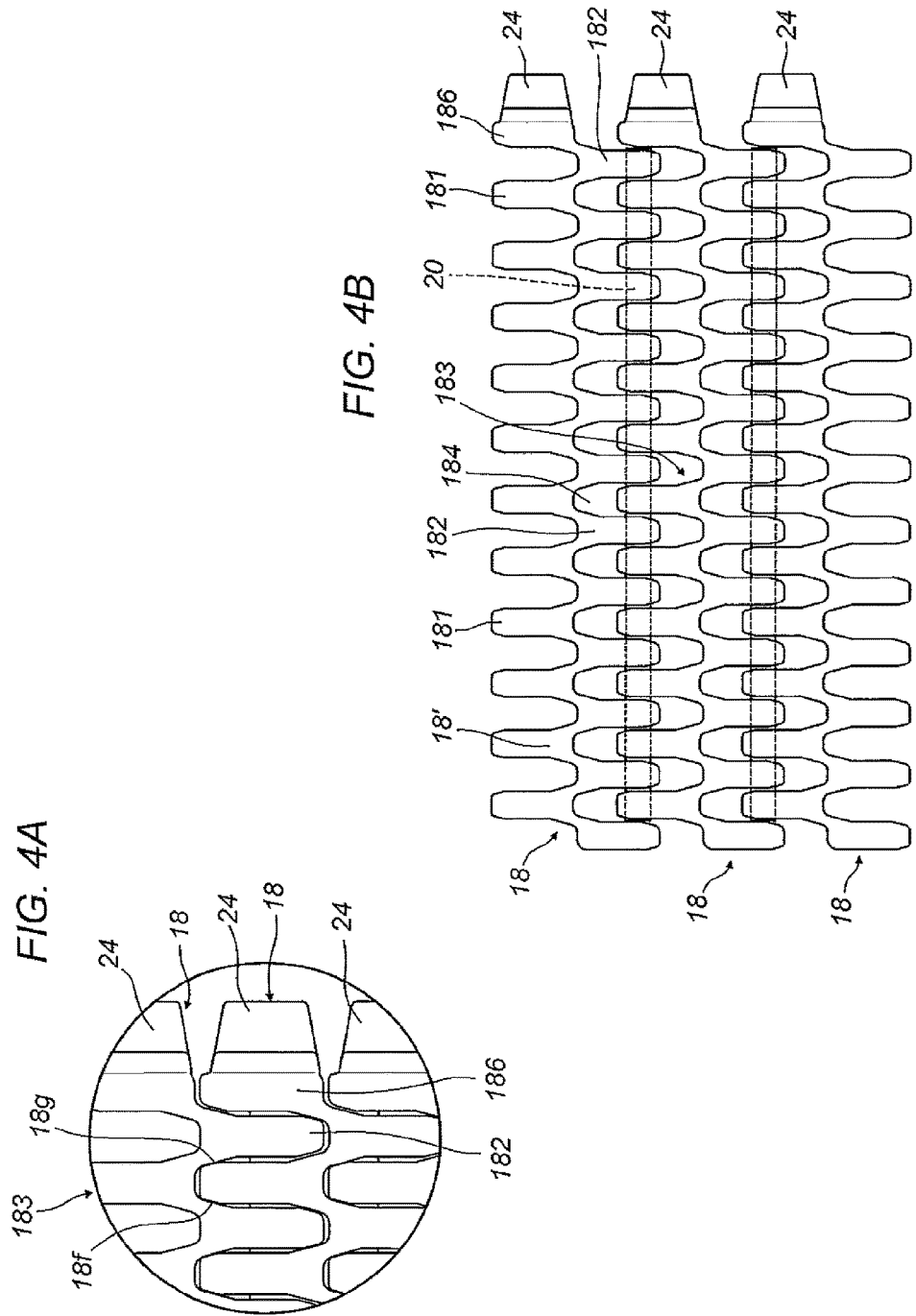
FIG. 4A is a top view of a detail of the links in the condition where they are close together.
FIG. 4B is a top plan view of the links in a condition where they are being driven and are apart from each other.
Figure 5:
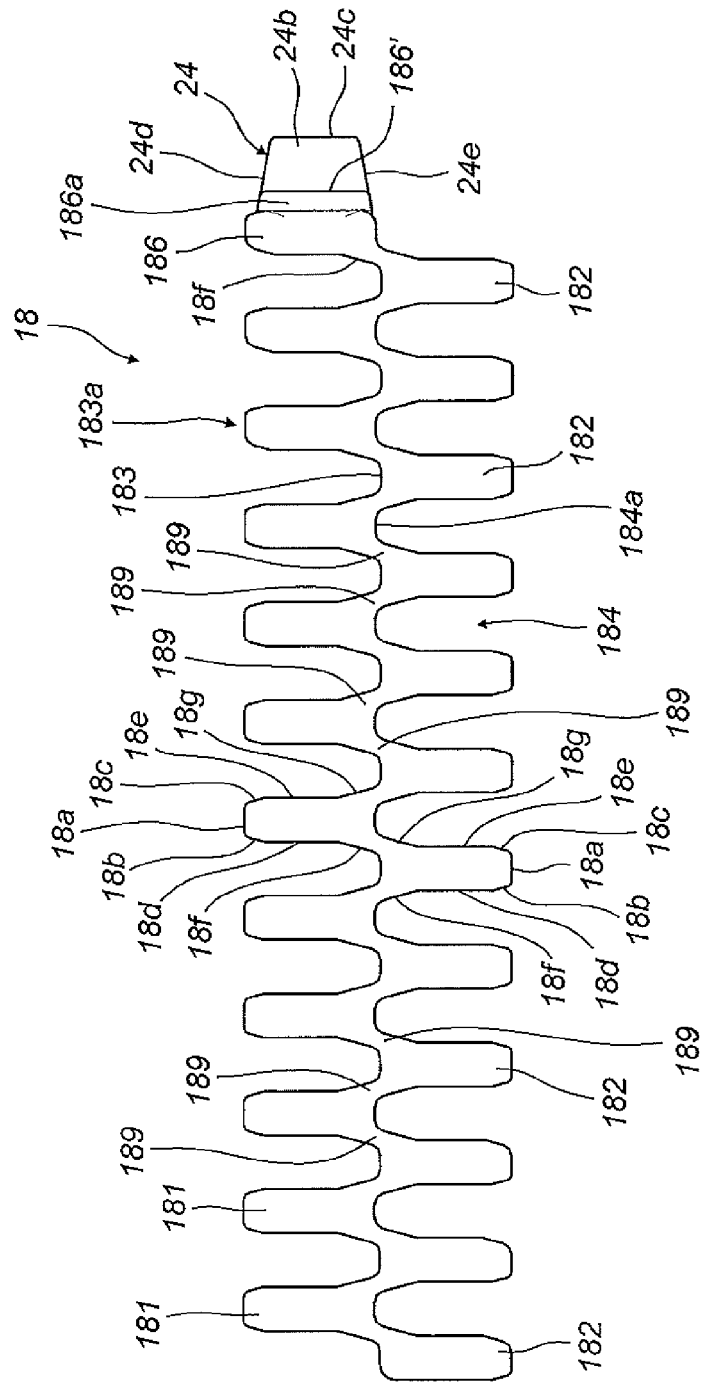
FIG. 5 is a top view of a preferred embodiment of the link used to make the conveyor according to the invention.
Figure 8:
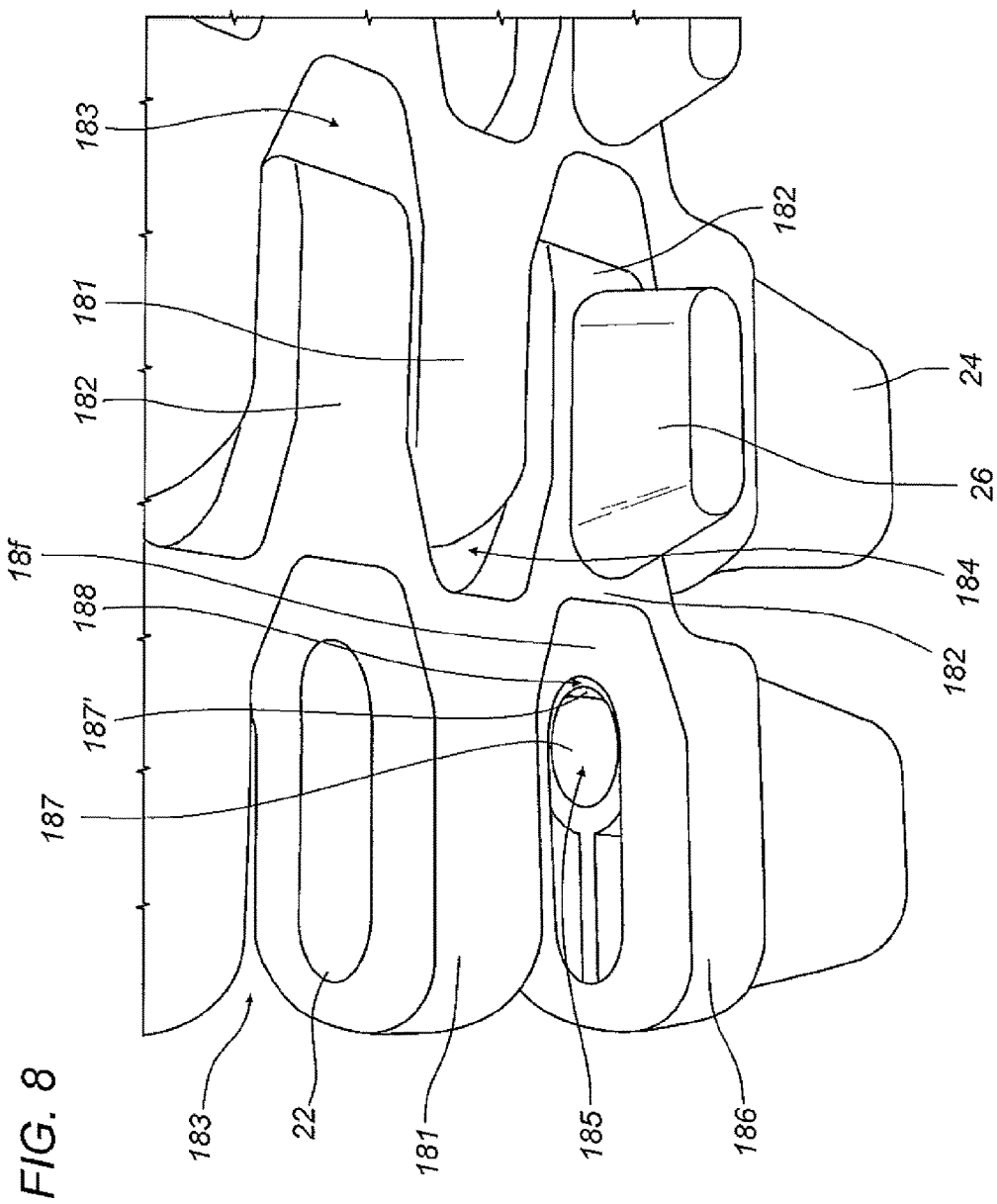
FIG. 8 is a perspective view from above of a lateral zone of corresponding links of the preferred embodiment of the invention.
Figure 9:
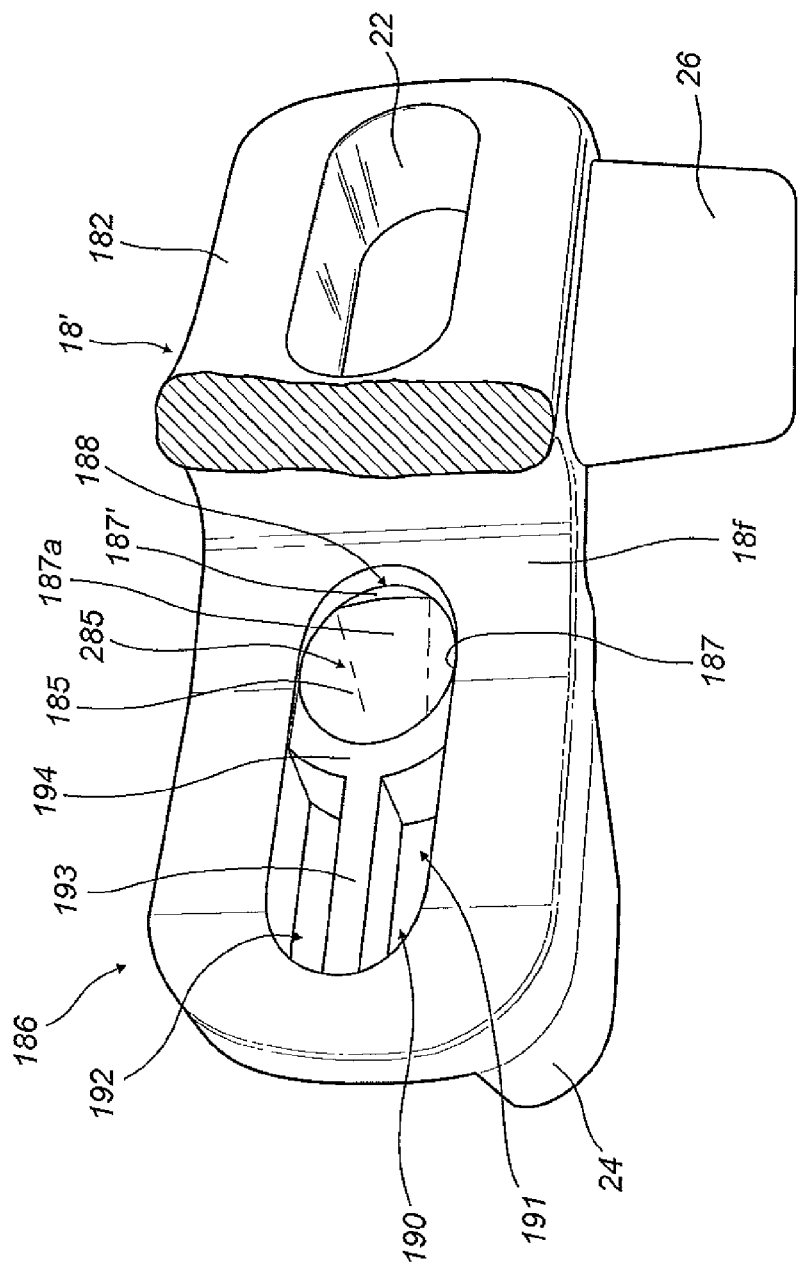
FIG. 9 is a perspective view, with some parts in cross section, showing in particular the longitudinal lateral protrusion of the link.

For slidably supporting the belt, or chain, and the product resting on it, as may be inferred from FIGS. 2A and 2B, supporting profiles 23 are provided which have an outside or upper surface 23a for engaging and coming into contact with the lower surface 180 of the belt or of the links.

The belt sliding and supporting means 23 are in the form of profiles which are positioned longitudinally, as illustrated in FIG. 2A, in the straight stretches, and obliquely, or in fishbone style, between the lateral flanks of the conveyor in the curved stretches, as illustrated in FIG. 2B, in substantially known manner within the knowledge of one familiar with the trade.

According to another advantageous aspect, the link 18 comprises a transversal protuberance 24, which is made as one with the body of the link 18, which extends laterally, transversally, of the link and which defines means for slidably engaging a longitudinal horizontal, perpendicular retaining surface 143, 142 of the guide means 14.

In practice, the laterally protruding protuberance 24 has a horizontal face 24a on the inside, or facing the perpendicularly internal part of the belt, for abutting against the surface 142, in the straight positive feed stretch of the belt 16, and an opposite horizontal face 24b on the outside, or facing the perpendicularly external part of the belt, for abutting against an upper or perpendicularly external guide surface 143 in the curved stretch, where the end part of the belt 16 itself rises, all obviously in the positive upper stretch of the belt.

In the negative, or return, stretch of the conveyor belt, as illustrated, it is the horizontal outside surface 24b which acts as supporting surface on the horizontal guide surface 143 of the lower guide 14.

As may be inferred from the drawings, the perpendicular thickness of the transversal protuberance 24 is less than the longitudinal length of the same transversal protuberance. Further, the transversal length of the transversal protuberance 24 is less than the longitudinal length of the same transversal protuberance.

Further, the perpendicular thickness of the same protuberance 24 is in turn less than the transversal extension or transversal length of the same lateral protuberance 24.

The transversal protuberance 24, as illustrated, has front and rear transversal sides that are slightly oblique and convergent towards the respective free end face 24c. The oblique transversal sides are labelled 24d, 24e in FIG. 5.

In practice, this conveyor comprises a transversal protuberance 24 which extends laterally of the link 18 and which forms means for engagement and sliding relative to a horizontal longitudinal, perpendicular retaining surface 143, 142 of the guide means 14.

The transversal protuberance 24 is integral, or made as one, with the lateral longitudinal protrusion 186 of the link 18, that is to say, with the link 18.

Further, the transversal protuberance 24 extends from the lateral longitudinal protrusion 186 and is positioned under or on the perpendicular inner side of the link 18 relative to the retaining hole 185.

In practice, the transversal protuberance 24 is perpendicularly positioned towards the inside of the belt, or towards the lower side of the link 18 in the positive feed stretch relative to the retaining means 185 for keeping the connecting pin 20 in the inserted condition.

The transversal protuberance 24 extends from the perpendicular inside, or lower, end of the lateral longitudinal protrusion 186 of the link 18.

As illustrated, the transversal protuberance 24 extends from the vertical longitudinal sliding and centering face 186', integral with the link body, of the lateral longitudinal protrusion 186 of the link 18.

According to a further advantageous aspect, this link 18 comprises a perpendicular protuberance 26, which extends perpendicularly towards the inside of the belt 16, or downwardly of the belt relative to the positive feed stretch of the belt, and which has, or defines, means 26a for engaging and sliding against a transversal centering surface 15a of the guide means 15 provided in a curved stretch 10b of the belt, and more specifically, in a curved stretch lying in the feed plane of the belt itself.

The perpendicular protuberance 26 acts in conjunction with a curved guide 15 which is advantageously positioned in such a way as to keep the inner side of the belt or link, that is, the lateral longitudinal protrusion 186, detached from the lateral guide 14, on the inner side of the curve.

Advantageously, the perpendicular protuberance 26 is made as one with the body of the link 18 and extends perpendicularly beyond the respective inside, or lower, surface 180 of the link or belt, since it is provided at a respective intermediate transversal position of the link.

The perpendicular protuberance 26 forms a lateral vertical surface 26a for engaging a lateral centering surface 15a of the guide means in a curved stretch of the belt.

More specifically, the perpendicular protrusion 26 extends from a horizontal longitudinal face of a longitudinal protrusion of the link 18.

Particularly advantageously, the perpendicular protuberance 26 extends from a longitudinal protrusion 182, which is adjacent to, and more specifically, immediately adjacent to the lateral end protrusion 186 of the link 18.

That way, it is possible to apply a more effective transversal retaining action on the belt.

Further, as illustrated, the perpendicular protuberance 26 extends from a longitudinal protrusion 182 which extends longitudinally in the opposite direction to the direction of longitudinal extension of the lateral end protrusion 186 of the link 18.

The perpendicular protuberance 26 and the matching guide 15 avoid overloading the links with excessive stresses, thus preventing undesirable and noisy vibrations.

As may be inferred from the drawings, the transversal thickness of the perpendicular protuberance 26 is less than the longitudinal length and perpendicular length of the same protuberance 26.

Further, the height, or perpendicular length of the protuberance 26 is less than the longitudinal length of the same perpendicular protuberance 26.

As illustrated, the perpendicular protuberance 26 has a flat end face 26c and transversal sides 26d, 26e which are slightly oblique and converge towards the flat end face 26c.

Also, as illustrated, the perpendicular protuberance 26 is in the form of a body with a uniform transversal thickness between two substantially flat, vertical longitudinal faces 26a, 26b.

In practice, in the curved stretches of the belt, and of the positive feed section of the same, the perpendicular protuberance 26 defines means for transversally centering the belt which are separate from the sliding and supporting means 23 and from the perpendicular, anti-lifting retaining means 14 of the same belt.

In practice, in this preferred embodiment, the perpendicular protuberance 26 is adapted to define, in the curved stretches of the belt, and of the positive feed section of the same, only the means for transversally centering the belt, since in these stretches, the belt is in contact, for transversal centering, only with the lateral surface 15a of the guide means 15.

The conveyor disclosed herein also comprises advantageous belt guide means 15 which are adapted to keep the belt 16 detached from the lateral guide means 14 which are on the inside of the curved stretch of the belt itself.

More specifically, and advantageously, the guide means 15 are provided in the vicinity of the outside of the curved stretch of the belt.

As illustrated, the guide means 15, which are adapted to keep the belt 16 detached from the inside guiding edge in the curved stretch, are in the form of a curved element 15, in cross section quadrangular—and more specifically, rectangular—which extends parallel to the curved lateral guide edges 14, 14 of the mounting structure, said guide element being in the form of a guide profile which extends longitudinally and which has an outside engagement and sliding face 15a for the intermediate face 26a of the perpendicular protuberance 26 that is provided at the outside edge of the curved stretch.

The curved guide element 15, defining means adapted to keep the belt detached from the lateral guide means on the inside of the curved stretches of the belt, is provided under the positive feed plane of the belt, since it lies transversally across the lateral flanks of the belt, that is to say, across the guide profiles 14, 14 of the belt.

The guide strip 15 has a section such that it can be easily flexed to allow it to be mounted on the frame 12. In practice, the strip 15 is in the form of a straight, or rectilinear, strip which, when assembled, is bent or curved to follow the belt plane and to define a curved guide.

The conveyor disclosed herein also comprises advantageous belt guide means 14, 14 which comprise a guide portion 14a and a fastening portion 14b for attachment to a respective supporting profile, where the fastening portion 14b is in the form of an enlarged portion—and more specifically, with a quadrangular profile—which is integral with the guide portion 14a through a narrow portion 14c—and more specifically, with a rectangular profile—which is designed to pass through a longitudinal slot of a supporting profile 120. The longitudinal slot is denoted by the reference numeral 121.

That way, it is possible to make a guide profile of plastic material which can be engaged with the metal load-bearing frame 12, that is to say, with the latter's longitudinal profiles 120 in an extremely easy manner. In effect, when assembling the conveyor, it is sufficient to insert the guide with the enlarged portion 14b into the profile 120 at one end of the conveyor and push the guide 14, 14 itself, which is in the form of a single elongate block of plastic material, in such a way as to make it slide along the path defined by the profile of the mounting frame.

Fitting the guide means, and more specifically, the lateral guide means 14, 14, to the mounting frame, is thus a particularly quick and easy task.

More in detail, the lateral guide means 14, 14 of the belt comprise a guide portion 14a having a horizontal longitudinal protrusion 14d which is directed towards the inside of the belt and which has a sliding surface 142 for the belt 16, in particular for the latter's lateral protuberance 24.

Further, the lateral guide means 14, 14 of the belt comprise a guide portion 14a having a horizontal longitudinal protrusion 14e which is directed towards the inside of the belt and which defines a horizontal perpendicular retaining surface 143 for the belt 16, in particular for the lateral protuberance 24.

As illustrated, the lateral guide means 14, 14 comprise a perpendicular portion 14f from which extend the aforesaid first and second horizontal longitudinal protrusions 14d, 14e which are perpendicularly spaced from each other in order to receive a lateral protuberance 24 of the belt 16 and whose respective opposing faces define the horizontal longitudinal sliding surfaces 142 and 143 for the lateral portion 24.

The perpendicular portion 14f is connected to the through portion 14c by the portion 14d which is on the transversal extension of the connecting portion 14c. The outside face of the portion 14f defines means for engaging the vertical wall 122 of the profile 120.

The mounting frame 12 also comprises, on each side, a respective lateral profile, comprising first and second lateral profiles 120, 120 for the positive feed and return stretches of the belt.

Each lateral profile 120 is in the form of a profile in the general shape of a C having a central slot 121, on the inside of it, defining a through portion for the passage of the portion 14c for connection to the enlarged portion 14b inside the supporting profile.

In practice, the mounting profile has a vertical lateral wall, denoted in its entirety by the reference numeral 122, which defines means for longitudinally inserting the guide through a respective longitudinal slot 121.

As illustrated, each of the longitudinal protrusions 181, 182, 186 comprises a tip portion having respective lateral longitudinal faces 18b, 18c, converging towards the front transversal face 18a of the protrusion, a main, or intermediate, portion, having lateral longitudinal faces 18d, 18e which are parallel to each other and substantially flat, and a fastening portion defined by oblique lateral faces 18f, 18g diverging from each other in the direction of the central part of the link, at an angle similar to that of the lateral faces of the tip portions 18b, 18c.

The oblique lateral faces of the fastening portions of the protrusions 181, 182 define, with the oblique lateral faces 18f, 18g of the longitudinal protrusions 181, 182 extending in the opposite direction, respective oblique connecting portions 189, 189 between the opposite longitudinal protrusions 181, 182.

As illustrated, between the adjacent longitudinal protrusions 181, 182 of a link, a respective longitudinal space 183, 184 is provided for receiving a corresponding longitudinal protrusion of a longitudinally adjacent link 18 of the belt 16.

More specifically, the longitudinal receiving space 183 has an innermost end face 183a that is positioned longitudinally beyond the transversal alignment or the transversal position of the innermost end face 184a of the longitudinal space 184 on the other longitudinal side of the link.

In practice, the length of the longitudinal receiving spaces 183, 184 is greater than the length of the longitudinal protrusions 181, 182 which is defined between the front face 18a and the corresponding rear face 183a, 184a.

The longitudinal insertion space 183, 184 has an inside end part, defined by the tapered, or oblique, sides, or faces, 18f, 18g which extend from a transversal innermost end face 183a, 184a of the respective longitudinal space 183, 184 and which receive and engage the tip of the longitudinal protrusion of the opposite link, and more specifically, the converging lateral longitudinal sides, or faces, 18b, 18c of the tip portion.

The tapered sides 18f, 18g of the longitudinal space are greater in longitudinal length than the converging lateral longitudinal faces 18b, 18c of the tip portion and are transversally spaced from each other in such a way that the converging lateral longitudinal faces 18b, 18c of the tip portion of the opposite longitudinal protrusion engage the aforesaid tapered sides 18f, 18g of the longitudinal space at a respective intermediate zone without the tip portion 18a of the respective protrusion coming into contact with the innermost end face 183a, 184a of the corresponding receiving space 183, 184.

That way, it is possible to make the oblique connecting portions 189, 189 suitably thicker to guarantee greater strength for the link.

As illustrated, the longitudinal protrusion has a substantially flat front face 18a joined by curved connecting portions 18h, 18i to the horizontal longitudinal faces 18l, 18m perpendicularly outside and inside the link.

The lateral longitudinal protrusion 186 also has advantageous cavity means designed to compensate for shrinkage after the link has been die formed, these cavity means 190 being provided on the outer longitudinal side of the link relative to the retaining hole 185.

The cavity means 190 comprise a first and a second elongate hollow 191, 192 between which extends a full portion or strip 193 for connection to a circumferential lip 194 defining the aforesaid retaining hole 185 on the opposite side.

The cavity means are provided at the transversally inner face of the lateral longitudinal protrusion 186.

In a second preferred embodiment, illustrated in FIG. 11, the conveyor might be provided with a link where the transversal centering means comprise advantageous rotatable contact means 126 which are equally advantageously mounted on a perpendicular protuberance 26, similar to that of the first embodiment described above, and where an internal cavity is made for housing the rotatable contact means 126.

The rotatable contact means 126 are preferably in the form of a roller or bearing which is supported rotatably about a perpendicular axis defined by a rod 126a which is inserted between an end portion 126' of the protuberance 126 and a base portion 126" of the same perpendicular protuberance 26.

The provision of the bearing, or roller, 126 for contact against the curved guide 15 on the outside of the curved sides of the belt improves smoothness and reduces the noise of the conveyor.

As illustrated, the bearing, or roller, 126 protrudes laterally of the perpendicular mounting protuberance 126.

The invention described is susceptible of industrial application.

It would be obvious to one skilled in the art that several changes and modifications can be made to the invention without departing from the spirit and scope of the invention, described in depth above. In particular, one skilled in the art could easily imagine further embodiments of the invention comprising one or more of the features described herein. It will also be understood that all the details of the invention may be substituted by technically equivalent elements.

The invention claimed is:

1. A conveyor (10) of an articulated chain type for transporting products, comprising:
   a conveyor belt (16), comprised of a plurality of links (18) that form means for supporting the product, the links connected to each other in articulated fashion;
   a mounting frame (12) that supports and guides the conveyor belt (16); and
   a belt guide, including a guide portion (14a), a fastening portion (14b), and a perpendicular portion (14f) from which there extends a first longitudinal portion (14d) and a second longitudinal portion (14e),
   wherein the fastening portion (14b) is formed as an enlarged portion connected to the guide portion (14a) via a narrow portion (14c) configured to pass through a longitudinal slot (121) of a supporting profile (120) of the mounting frame (12),
   wherein the fastening portion (14b) of the belt guide is configured to slide along a longitudinal path defined by supporting profile (120) thereby to be inserted into the supporting profile (120),
   wherein the first longitudinal portion (14d) defines a first horizontal longitudinal protrusion directed towards an inside of the belt and having a sliding surface (142) for the belt (16),
   wherein the second longitudinal portion (14e) defines a second horizontal longitudinal protrusion directed towards the inside of the belt and having a retaining surface (143) for the belt (16), and
   wherein the first longitudinal portion (14d) and the second longitudinal portion (14e) are perpendicularly spaced from each other to permit insertion therein of a lateral protuberance (24) extending laterally from the links (18) of the belt (16).

2. The conveyor according to claim 1, wherein said respective faces of the sliding surface (142) and the retaining surface (143) oppose each other.

3. The conveyor according to claim 1, wherein the perpendicular portion (14f) is connected to the narrow portion (14c) by the first longitudinal portion (14d) which is on a transversal extension of the narrow portion (14c).

4. The conveyor according to claim 1, wherein an outside face of the perpendicular portion (14f) defines means for engaging a vertical wall (122) of the supporting profile (120).

5. The conveyor according to claim 1, wherein the fastening portion (14b) has a quadrangular profile and more specifically has a rectangular profile.

6. The conveyor according to claim 1, wherein the belt guide is formed of plastic material.

7. The conveyor according to claim 1, wherein the mounting frame comprises, on each side, a respective lateral profile comprising a first and a second profile for the positive and return stretches of the belt.

8. The conveyor according to claim 1, wherein the mounting frame comprises a vertical side wall (122) having a longitudinal slot (121) into which a fastening portion of the belt guide can be inserted.

9. The conveyor according to claim 1, wherein the supporting profile (120) is in the general shape of a C, with a central slot (121) on an inside of the supporting profile (120) defining a through portion for the passage of the narrow portion (14c) for connection to the fastening portion (14b) inside the supporting profile.

10. The conveyor according to claim 1, wherein the mounting frame (12) is formed of metal.

11. The conveyor according to claim 1, wherein the link has opposite pluralities of longitudinal protrusions (181, 182) where the respective longitudinal protrusions are transversally spaced from each other in such a way as to form respective spaces (183, 184) for receiving the longitudinal protrusions of an adjacent link.

12. The conveyor according to claim 1, wherein the lateral protuberance (24) extends laterally from the link and forms a means for engagement and sliding relative to the sliding surface and the retaining surface (142,143) of the belt guide (14).

13. The conveyor according to claim 11, wherein the lateral protuberance (24) is made in a single piece with the body of the link (18).

14. The conveyor according to claim 11, wherein the lateral protuberance (24) is integral with a lateral longitudinal protrusion (186) of the link (18).

15. The conveyor according to claim 14, wherein the lateral protuberance (24) extends from a perpendicular inside end of the lateral longitudinal protrusion (186) of the link (18).

16. The conveyor according to claim 11, wherein the lateral protuberance (24) extends from a vertical longitudinal sliding and centring face (186') of the link (18) engaging and sliding against an opposite longitudinal vertical surface (141) of the belt guide (14).

17. The conveyor according to claim 11, wherein the lateral protuberance (24) of the link (18) defines means for slidably engaging the sliding surface and the retaining surface (143, 142) of the belt guide (14).

18. The conveyor according to claim 11, wherein the lateral protuberance (24) of the link (18) has an inside horizontal face (24*a*) facing a perpendicularly internal part of the belt, for abutting against the sliding surface (142), in a straight positive feed stretch of the belt (16).

19. The conveyor according to claim 18, wherein the lateral protuberance (24) of the link (18) has an outside horizontal face (24*b*) facing a perpendicularly external part of the belt, for abutting against the retaining surface (143), in the straight positive feed stretch of the belt (16).

\* \* \* \* \*